(12) United States Patent
Hibbler et al.

(10) Patent No.: US 6,540,640 B2
(45) Date of Patent: Apr. 1, 2003

(54) POWER ON DEMAND DIFFERENTIAL

(75) Inventors: John Clinton Hibbler, Lake Orion, MI (US); David Marshall Morse, Waterford, MI (US); Rajendra G. Kumashi, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/782,700

(22) Filed: Feb. 13, 2001

(65) Prior Publication Data
US 2002/0111245 A1 Aug. 15, 2002

(51) Int. Cl.[7] .............................................. F16H 48/06
(52) U.S. Cl. ....................................... 475/230; 475/231
(58) Field of Search ........................ 192/54.5; 180/247; 475/230, 221, 243, 257, 231

(56) References Cited

U.S. PATENT DOCUMENTS

| | | | |
|---|---|---|---|
| 2,231,968 A | | 2/1941 | Thornton |
| 2,638,794 A | | 5/1953 | Knoblock |
| 3,362,258 A | | 1/1968 | Thornton |
| 3,628,399 A | * | 12/1971 | Seitz et al. ................. 475/230 |
| 3,958,464 A | | 5/1976 | Kronbergs |
| 4,727,769 A | * | 3/1988 | Wu ............................. 180/249 |
| 4,792,010 A | * | 12/1988 | Kitao et al. ................. 180/233 |
| 4,815,337 A | | 3/1989 | Peloquin |
| 4,815,338 A | | 3/1989 | Holan et al. |
| 4,854,413 A | * | 8/1989 | Kameda et al. ............. 180/247 |
| 5,005,663 A | * | 4/1991 | Niide et al. ................. 180/247 |
| 5,007,886 A | * | 4/1991 | Holmquist et al. ......... 475/230 |
| 5,036,939 A | * | 8/1991 | Johnson et al. ............. 180/233 |
| 5,037,362 A | * | 8/1991 | Teraoka et al. ............. 475/230 |
| 5,057,062 A | * | 10/1991 | Yamasaki et al. ........... 475/221 |
| 5,103,690 A | * | 4/1992 | Macpherson et al. ....... 180/233 |
| 5,105,517 A | * | 4/1992 | Barnow ....................... 180/247 |
| 5,193,639 A | * | 3/1993 | Hara et al. .................. 180/247 |
| 5,562,561 A | | 10/1996 | Gillard |
| 5,857,936 A | | 1/1999 | Ishikawa |
| 6,432,020 B1 | * | 8/2002 | Rivera et al. ............... 475/231 |
| 6,491,126 B1 | * | 12/2002 | Robison et al. ............. 180/233 |

FOREIGN PATENT DOCUMENTS

JP          01049740 A   *  2/1989  ............. F16H/1/44

* cited by examiner

Primary Examiner—Rodney H. Bonck
Assistant Examiner—David D. Le
(74) Attorney, Agent, or Firm—Harness, Dickey & Pierce P.L.C.

(57) ABSTRACT

A differential assembly having a first structure, which is configured to rotate along a differential axis in response to receipt of a rotational input, a second structure, which is supported for rotation on the differential axis, a third structure, which is supported for rotation on the differential axis and disposed between the first and second structures and operable in an engaged condition that transmits torque between the first and second structures and a disengaged condition that inhibits torque transmission between the first and second structures, a differential gear set, which is coupled to and rotatably supported within the second structure, and a biasing mechanism, which biases the third structure in the disengaged condition. The third structure is placed in the engaged condition if a torsional magnitude of the rotational input exceeds a rotational force that is exerted through the differential gear set. A vehicle drive train is also provided.

24 Claims, 4 Drawing Sheets

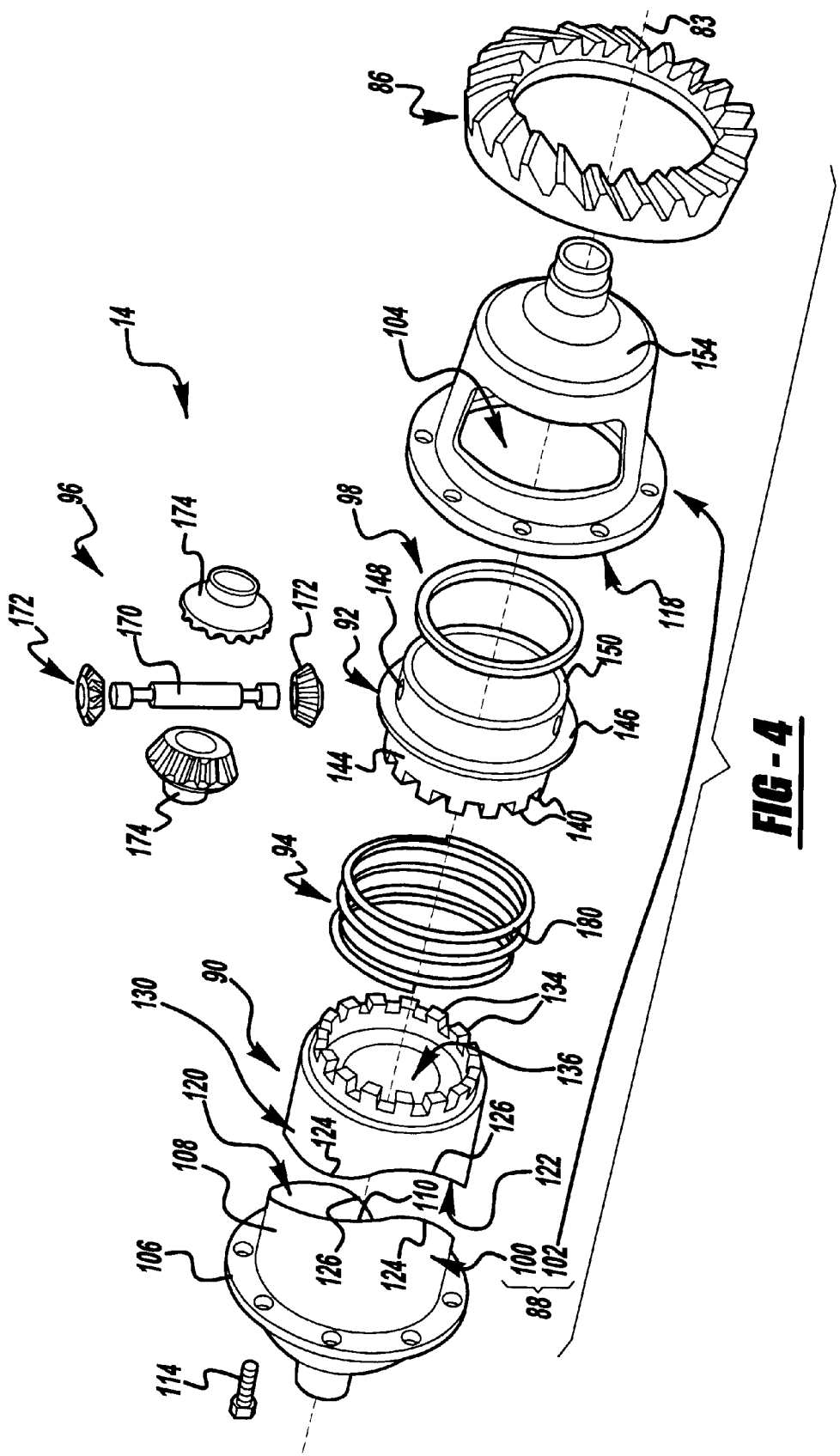

POWER ON DEMAND DIFFERENTIAL

BACKGROUND OF THE INVENTION

1. Technical Field

The present invention generally relates to vehicle drivelines and more particularly to a differential assembly for a vehicle driveline that selectively transmits power to a set of vehicle wheels.

2. Discussion

Modernly, vehicle manufacturers are employing vehicle drivetrains having more than one drive axle to improve vehicle traction. Common arrangements include part-time four-wheel drive systems that employ a front axle disconnect to selectively disconnect the front wheels from the front of the vehicle drivetrain. These arrangements are commonly known as rear drive/front assist drivetrains. Disconnection of the front wheels from the front of the vehicle drivetrain prevents the front drive wheels from rotating the front of the vehicle drive train at road speed, thereby saving wear and tear on the vehicle driveline. The front axle disconnect also controls the coupling of the front wheels to the front of the vehicle driveline such that the front driveshaft will spin at the same speed as the rear driveshaft.

Despite the relatively widespread use of such drivetrain arrangements, several drawbacks are known to exist, such as their cost and the amount of time that is sometimes necessary for the front axle disconnect to engage and disengage the front of the vehicle driveline to the front wheels. In isolating the front wheels from the rest of the front driveline, front axle disconnects typically use a sliding sleeve to connect or disconnect an axle shaft from the front differential side gear. Vehicle manufacturers typically use either vacuum or heat to move the engagement sleeve and as such, the time that is required to shift the sliding sleeve to a desired position can be relatively long, particularly when heat is employed to heat a fluid to generate sufficient pressure to cause the engagement sleeve to move.

Accordingly, there remains a need in the art for a vehicle driveline that is less costly and which provides improved response in the time for the engagement and disengagement of the vehicle drivetrain to the vehicle wheels.

SUMMARY OF THE INVENTION

In one preferred form, the present invention provides a differential assembly having first, second and third structures, a differential gear set and a biasing mechanism. The first structure is configured to rotate along a differential axis in response to receipt of a rotational input. The second structure is supported for rotation on the differential axis. The third structure is supported for rotation on the differential axis and disposed between the first and second structures. The third structure can be operated in an engaged condition for transmitting torque from the first structure to the second structure and a disengaged condition for inhibiting the transmission of torque from the first structure to the second structure. The differential gear set is coupled to and rotatably supported within the second structure. The biasing mechanism biases the third structure in the disengaged condition. The third structure is placed in the engaged condition if a torsional magnitude of the rotational input exceeds by a predetermined amount a torsional magnitude of a rotational force exerted through the differential gear set.

In another preferred form, the present invention provides a vehicle drive train having a transfer case assembly and first and second axle assemblies. The transfer case assembly receives a rotational input from a vehicle power source and produces first and second intermediate rotational outputs therefrom. The first axle assembly is coupled to the transfer case assembly, receives the first intermediate rotational output therefrom and produces a first drive wheel output for rotating a first set of drive wheels. The second axle assembly has a differential assembly with a differential housing member configured to rotate about differential axis in response to receipt of the second intermediate rotational output, a differential case member supported for rotation on the differential axis, a cam member supported for rotation on the differential axis and disposed between the differential housing member and the differential case member and a differential gear set. The cam member can be operated in an engaged condition for transmitting torque from the differential housing member to the differential case member and a disengaged condition for inhibiting the transmission of torque from the differential housing member to the differential case member. The differential gear set is coupled to and rotatably supported within the differential case member. Operation of the cam member in the engaged condition permits the differential gear set to produce a second drive wheel output to rotate a second set of drive wheels. Operation of the cam member in the disengaged condition inhibits the differential from producing the second drive wheel output and permitting the second set of drive wheels to rotate freely.

BRIEF DESCRIPTION OF THE DRAWINGS

Additional advantages and features of the present invention will become apparent from the subsequent description and the appended claims, taken in conjunction with the accompanying drawings, wherein:

FIG. 4 is an exploded perspective view of a portion of the front axle assembly of FIG. 3 illustrating the differential assembly in greater detail.

DETAILED DESCRIPTION OF THE PREFERRED EMBODIMENT

Figure 1:
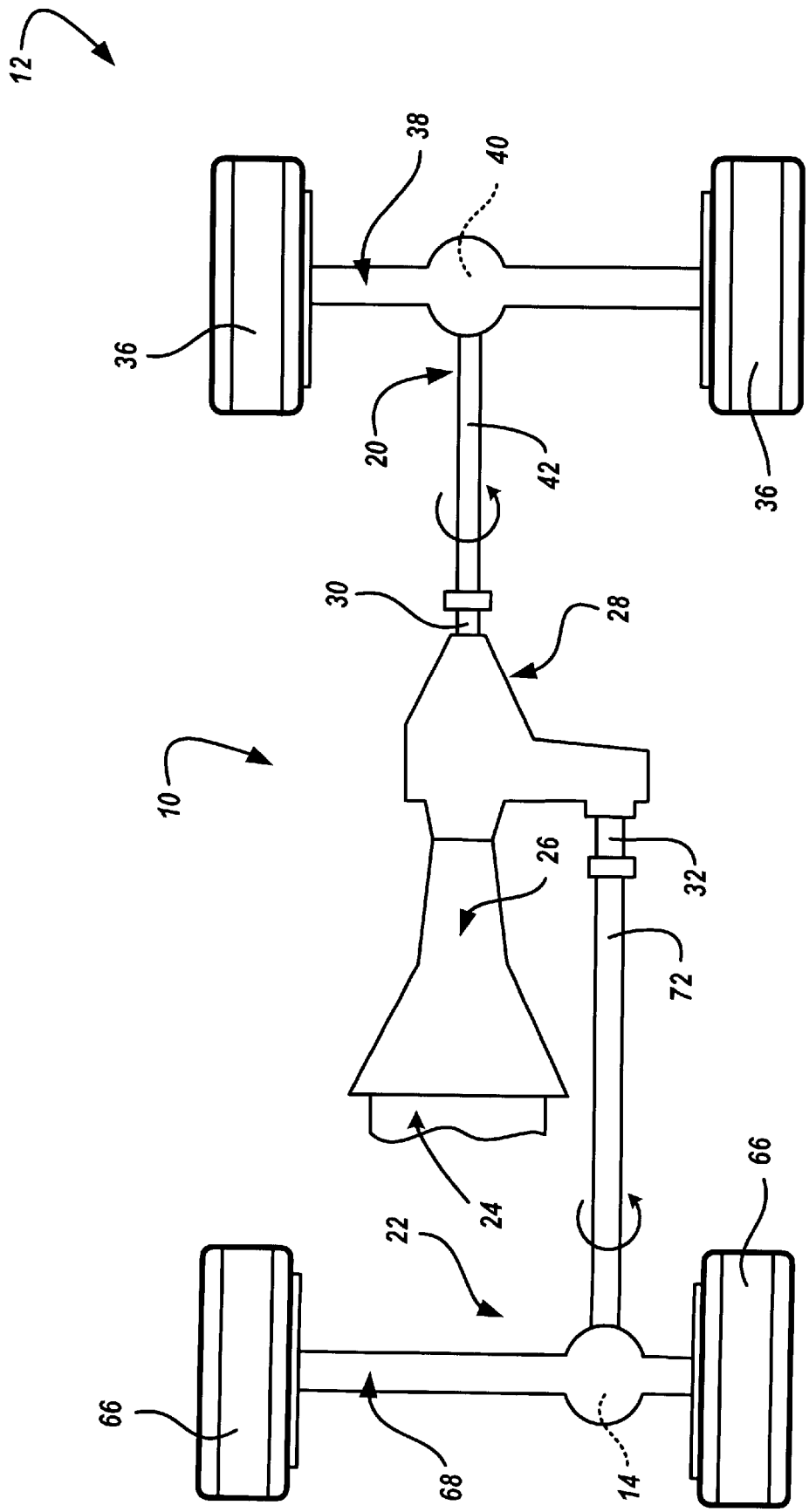
FIG. 1 is a schematic view of the drivetrain of an exemplary motor vehicle constructed in accordance with the teachings of the present invention.

Referring now to FIG. 1 of the drawings, a drivetrain 10 for a part-time four-wheel drive vehicle 12 is schematically shown interactively associated with a differential assembly 14 constructed in accordance with the teachings of the present invention. The drivetrain 10 includes a rear driveline 20 and a front driveline 22 which are both drivable from a source of power, such as an engine 24, through a transmission 26 which may be of either the manual or automatic type. In the particular embodiment shown, the drivetrain 10 is a rear drive/front assist system which incorporates a transfer case 28 for transmitting drive torque from the engine 24 and the transmission 26 to the rear and front drivelines 20 and 22. The transfer case 28 is preferably a non-differentiating transfer case that causes the rear and front transfer case output shafts 30 and 32, respectively to rotate at the same rotational speed.

Figure 2:
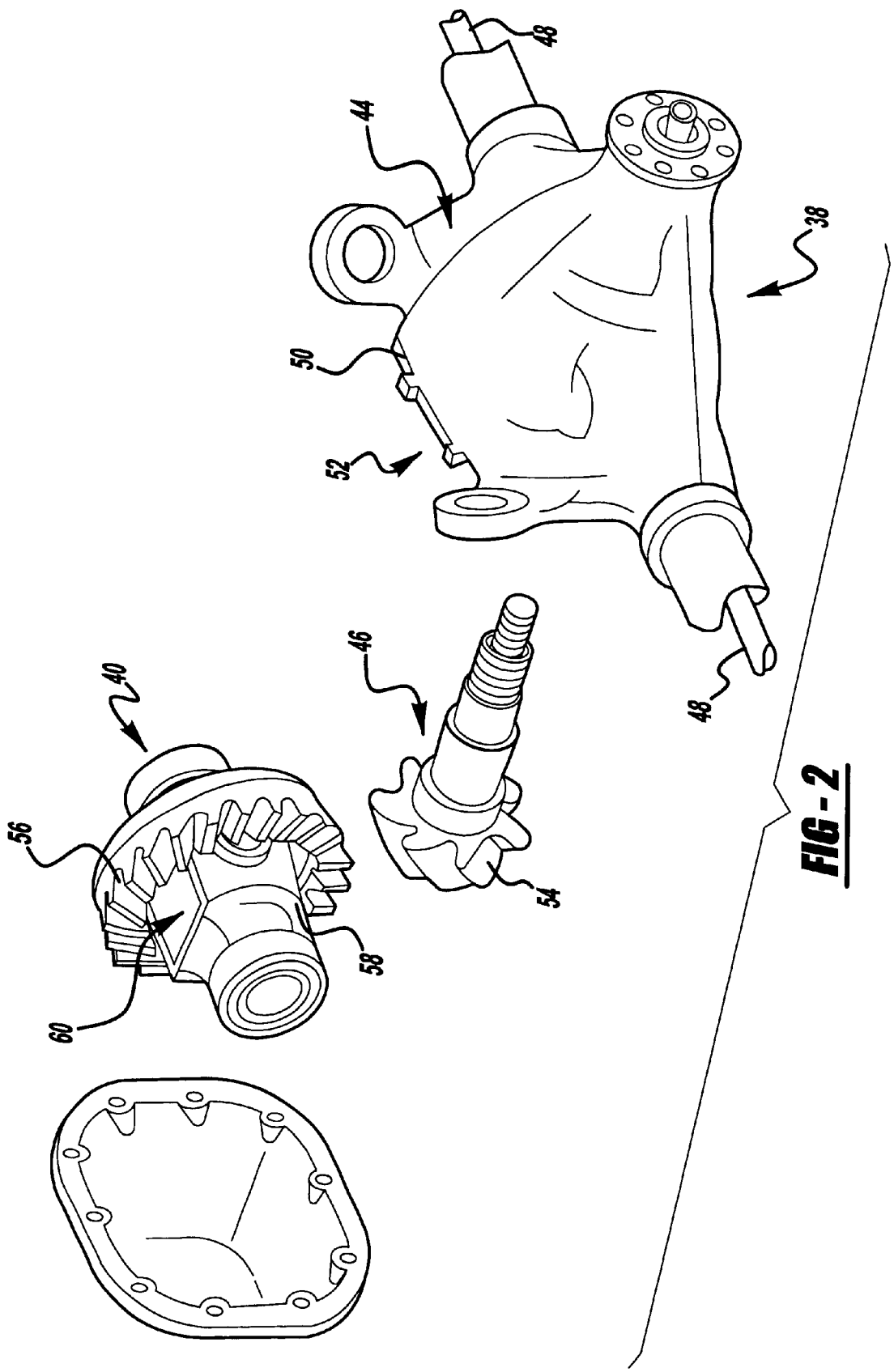
FIG. 2 is an exploded perspective view of a portion of the drivetrain of FIG. 1 illustrating the rear axle assembly in greater detail.

With additional reference to FIG. 2, the rear driveline 20 is conventional in its construction and operation and includes a pair of rear wheels 36 connected at the opposite ends of a rear axle assembly 38 having a rear differential assembly 40 coupled to one end of a rear prop shaft 42, the opposite end of which is interconnected to a rear transfer case output shaft 30 of the transfer case 28. The rear axle assembly 38 includes a rear axle housing 44, a rear pinion shaft 46 and a pair of rear axle shafts 48 that are interconnected to a respective one of the left and right rear wheels 36. The rear axle housing 44 has a wall member 50 that defines a differential cavity 52 into which the rear differential assembly 40 is rotatably supported. The rear pinion shaft 46 has a pinion gear 54 that is fixed thereto which drives a ring gear 56 that is fixed to a differential case 58 of the rear differential assembly 40. A gearset 60 supported within the differential case 58 transfers rotary power from the differential case 58 to the rear axle shafts 48 to facilitate relative rotation (i.e., differentiation) therebetween. Thus, rotary power from the engine 24 is transmitted to the rear axle shafts 48 for driving the left and right rear wheels 36 via the transmission 26, the transfer case 28, the rear prop shaft 42, the rear pinion shaft 46, the differential case 58 and the gearset 60.

Figure 3:
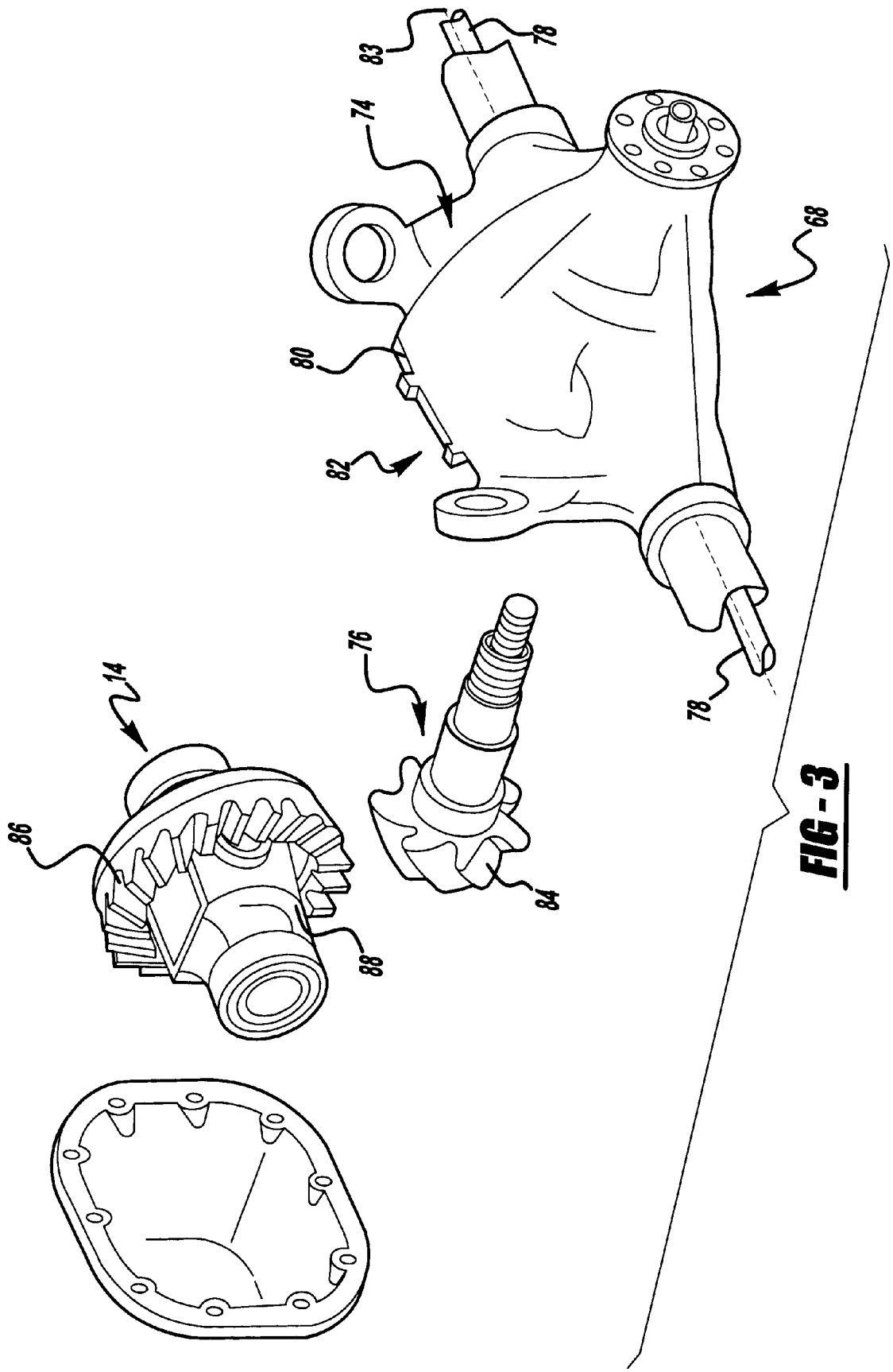
FIG. 3 is an exploded perspective view of a portion of the drivetrain of FIG. 1 illustrating the front axle assembly in greater detail.

With reference to FIGS. 1 and 3, the front driveline 22 includes a pair of front wheels 66 connected at the opposite ends of a front axle assembly 68 having the differential assembly 14 coupled to one end of a front prop shaft 72, the opposite end of which is interconnected to the front transfer case output shaft 32 of the transfer case 28. The front axle assembly 68 includes a front axle housing 74, a front pinion shaft 76, the front differential assembly 14, a pair of front axle shafts 78 that are interconnected to left and right front wheels 66. The front axle housing 74 has a wall member 80 that defines a differential cavity 82 into which the front differential assembly 14 is supported for rotation about a differential axis 83. The front pinion shaft 76 has a pinion gear 84 that is fixed thereto which drives a ring gear 86 that is fixed to a differential housing assembly 88 of the front differential assembly 14.

With reference to FIG. 4, the front differential assembly 14 is shown in greater detail to also include a cam member 90, a differential case member 92, a biasing mechanism 94, a gearset 96 and a thrust washer 98. The differential housing assembly 88 includes a first housing member 100 and a second housing member 102 that collectively define a differential cavity 104. The first housing member 100 is generally hollow and includes a retaining flange 106, an extending portion 108 and a first housing aperture 110. The retaining flange 106 is operable for receiving a plurality of fasteners 114 to permit the first and second housing members 100 and 102 and the ring gear 86 to be fixedly but removably coupled together. The extending portion 108 is configured to at least partially extend into a second housing aperture 118 formed into the second housing member 102. The extending portion 108 terminates at an abutting face 120 that is configured to abut an abutting face 122 formed in the cam member 90. Each of the abutting faces 120 and 122 are illustrated to be formed by a plurality of peaks 124 and valleys 126, the purpose of which will be discussed in greater detail, below.

The cam member 90 is illustrated to have a generally hollow cylindrical configuration and is rotatably supported within the differential cavity 104 between the first housing member 100 and the differential case member 92. The cam member 90 includes a cam portion 130 into which the abutting face 122 is formed, a collar portion 132, a plurality of teeth 134 and an aperture 136 extending through the cam member 90 and formed along the longitudinal axis of the cam member 90. Bushings or bearings (not specifically shown) may be mounted within the second housing member 102 in the second housing aperture 118 to support the cam member 90 for rotation within the differential cavity 104 about the differential axis 83. Each of the plurality of teeth 134 formed into the cam member 90 are illustrated to have a generally square configuration that is configured to meshingly engage a plurality of teeth 140 formed in the differential case member 92 to permit rotary power to be transferred between the cam member 90 and the differential case member 92. Those skilled in the art will understand, however, that the particular configuration of the teeth 134 and 140 which is illustrated is merely exemplary and not intended to be limiting in any manner. Accordingly, those skilled in the art will understand that the teeth 134 and 140 may have another configuration or that they may be omitted altogether if another means for transferring power between the cam member 90 and the differential case member 92, such as one that utilizes friction between the mating surfaces of the cam member 90 and the differential case member 92, is employed.

The cam member 90 is operable in a disengaged condition and an engaged condition. When positioned in the disengaged condition, the peaks 124 and valleys 126 of the abutting face 120 of the first housing member 100 are positioned against the valleys 126 and peaks 124, respectively, of the abutting face 122 of the cam member 90 and the teeth 134 formed in the cam member 90 are spaced apart from the teeth 140 formed into the differential case member 92. As such, rotary power cannot be transmitted between the cam member 90 and the differential case member 92. When positioned in the engaged condition, the peaks 124 and valleys 126 of the abutting face 120 of the first housing member 100 are positioned against the peaks 124 and valleys 126, respectively, of the abutting face 122 of the cam member 90 and the teeth 134 formed in the cam member 90 are meshingly engaged with the teeth 140 formed into the differential case member 92, thereby facilitating the transmission of rotary power therebetween.

The differential case member 92 is also illustrated to have a generally hollow cylindrical configuration. In addition to the teeth 140 that are formed into an extending portion 144, the differential case member 92 includes a flange member 146 and a pinion shaft aperture 148 which is positioned generally perpendicularly to the longitudinal axis of the differential case member 92. As with the cam member 90, bushings or bearings (not specifically shown) may be mounted within the second housing member 102 in the second housing aperture 118 to support the differential case member 92 for rotation within the differential cavity 104 about the differential axis 83. The end of the differential case member 92 opposite the end having the teeth 140 terminates at a thrust flange 150 that is configured to contact the thrust washer 98. The thrust washer 98 is disposed between the thrust flange 150 and an end portion 154 of the second housing member 102 being configured to reduce the friction between the thrust flange 150 and the end portion 154.

The gearset 96 is illustrated to include a pinion shaft 170, a pair of pinions 172 and a pair of side gears 174. The pinion shaft 170 extends through the pinion shaft aperture 148 and is fixedly coupled to the differential case member 92. The pinion shaft 170 rotatably supports the pair of pinions 172, each of which is meshingly engaged to the pair of side gears 174. The front axle shafts 78 are coupled at a first end to an associated one of the side gears 174 and at an opposite end to an associated one of the left and right front wheels 66.

The biasing mechanism 94 is operable for maintaining the cam member 90 in the disengaged condition until a predetermined condition has occurred. In the particular embodiment illustrated, the biasing mechanism 94 is a compression spring 180 that encircles the teeth 134 and 140 of the cam member 90 and the differential case member 92. The spring 180 is operable for generating a biasing force that is transmitted to the collar portion 132 and the flange member 146 to thereby axially space the cam member 90 and the differential case member 92 apart along the differential axis 83.

Rotary power from the engine 24 is transmitted to the differential assembly 14 via the transmission 26, the transfer case 28, the front prop shaft 72 and the pinion shaft 76, causing the differential housing assembly 88 to rotate about the differential axis 83. When the cam member 90 is in the disengaged condition, rotary power is not transmitted through the cam member 90 to the differential case member 92, and as such, the rotary power is not transmitted to the front wheels 66 via the front axle shafts 78. The front wheels 66, however, are free to rotate at the road speed of the vehicle and as such, cause the front axle shafts 78, the gearset 96 and the differential case member 92 to rotate about the differential axis 83. When the cam member 90 is in the engaged condition, rotary power is transmitted through the cam member 90 to the differential case member 92, and as such, the rotary power is transmitted to the front wheels 66 via the differential case member 92, the gearset 96 and the front axle shafts 78. In the particular example provided, the configuration of the gear set 96 provides the differential assembly 14 with a bias ratio of one (1) when the cam member 90 is in the engaged condition.

In operation, drive torque produced by the engine 24 is transmitted via the transmission 26 and the transfer case 28 to the rear and front transfer case output shafts 30 and 32. In normal operating conditions where the rear and front wheels 36 and 66 have good traction, the engine drive torque is substantially transmitted through the rear prop shaft 42 to the rear axle assembly 38 for driving the left and right rear wheels 36. This distribution of the engine drive torque results from the biasing of the cam member 90 in the disengaged condition. As traction in the rear wheels 36 is sufficiently good, the driveline 10 is not able to transmit enough of the drive torque to the front prop shaft 72 to cause the first housing member 100 to rotate relative to the cam member 90, and as such, the cam member 90 will remain in the disengaged condition and the front wheels 66 are permitted to spin freely.

When the rear wheels 36 begin to slip in excess of a predetermined amount, however, the drive torque transmitted through the front prop shaft 72 will exceed the magnitude of the torque that is exerted through the gearset 96 by the rotation of the front wheels 66, permitting the first housing member 100 to overcome the biasing force generated by the biasing mechanism 94 and rotate relative to the cam member 90 causing the cam member 90 to be positioned in the engaged condition. As such, engine drive torque is distributed to the front wheels 66 through the gearset 96.

Construction of the drivetrain 10 in this manner is highly advantageous in that the differential assembly 14 produces a relatively simple and inexpensive part-time four-wheel drive system that may be instantaneously actuated in response to wheel slip without the use of sensors or electronic control mechanisms.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A differential assembly comprising:
    a first structure configured to rotate along a differential axis in response to receipt of a rotational input;
    a second structure supported for rotation on the differential axis;
    a third structure supported for rotation on the differential axis and disposed between the first and second structures, the third structure operable in an engaged condition for transmitting torque from the first structure to the second structure, the third structure also being operable in a disengaged condition for inhibiting the transmission of torque from the first structure to the second structure;
    a differential gear set coupled to and rotatably supported within the second structure;
    a biasing mechanism for biasing the third structure in the disengaged condition; and
    a cam, the cam being operable for sliding the third structure along the differential axis to position the third structure in the engaged and disengaged conditions;
    wherein the third structure is placed in the engaged condition if a torsional magnitude of the rotational input exceeds by a predetermined amount a torsional magnitude of a rotational force exerted through the differential gear set; and
    wherein the cam is formed by a pair of abutting faces, the abutting faces being formed in the first and third structures.

2. The differential assembly of claim 1, wherein at least one of the second and third structures includes a plurality of teeth for engaging the other one of the second and third structures when the third structure is the engaged position.

3. The differential assembly of claim 1, wherein the biasing mechanism is a spring disposed between the second and third structures.

4. The differential assembly of claim 1, wherein the gear set includes a pair of side gears.

5. The differential assembly of claim 1, wherein the differential assembly has a bias ratio of about 1 when the third structure is in the engaged condition.

6. The differential assembly of claim 1, further comprising a fourth structure, the fourth structure being coupled to the first structure for rotation about the differential axis, the first and fourth structures cooperating to define a cavity for receiving the second and third structures and the biasing mechanism.

7. The differential assembly of claim 6, further including a thrust washer disposed between a pair of contacting surfaces formed in the second and fourth structures.

8. The differential assembly of claim 6, wherein a ring gear is fixedly coupled to one of the first and fourth structures.

9. A vehicle drivetrain comprising:
    a transfer case assembly receiving a rotational input from a vehicle power source and producing first and second intermediate rotational outputs therefrom;

a first axle assembly coupled to the transfer case assembly and receiving the first intermediate rotational output and producing a first drive wheel output adapted to rotate a first set of drive wheel;

a second axle assembly having a differential assembly with a differential housing member configured to rotate about a differential axis in response to receipt of the second intermediate rotational output, a differential case member supported for rotation on the differential axis, a cam member supported for rotation on the differential axis and disposed between the differential housing member and the differential case member, the cam member having a cam portion formed by a pair of abutting faces in the differential housing member and the cam member, the cam member operable in an engaged condition for transmitting torque from the differential housing member to the differential case member, the cam member also being operable in an disengaged condition for inhibiting the transmission of torque from the differential housing member to the differential case member, and a differential gear set coupled to and rotatably supported within the differential case member;

wherein operation of the cam member in the engaged condition permits the differential gear set to produce a second drive wheel output to rotate a second set of drive wheels and wherein operation of the cam member in the disengaged condition inhibits the differential from producing the second drive wheel output and permitting the second set of drive wheels to rotate freely.

10. The vehicle drivetrain of claim 9, wherein the cam member is positioned in the engaged condition when a torsional magnitude of the second intermediate rotational output exceeds a torsional of a rotational force exerted through the differential gear set when the second set of drive wheels is freely rotated.

11. The vehicle drivetrain of claim 9, wherein the second axle assembly is a front axle of a vehicle.

12. The vehicle drivetrain of claim 9, wherein the differential assembly has a bias ratio 1 when the cam member is in the engaged position.

13. The vehicle drivetrain of claim 9, wherein the differential gearset includes a pair of side gears, a differential pinion and a pair of differential pinion gears, each of the differential pinion gears being supported for rotation on the differential pinion and meshingly engaged with the side gears.

14. The vehicle drivetrain of claim 9, wherein a biasing mechanism is employed to bias the cam member in the disengaged position.

15. The vehicle drivetrain of claim 14, wherein the biasing mechanism is a spring for spacing apart the cam member and the differential case member.

16. The vehicle drivetrain of claim 9, wherein the cam member is positioned in the engaged condition by relative rotation between the differential housing member and the cam member.

17. The vehicle drivetrain of claim 16, wherein the cam member slides along the differential axis in response to relative rotation between the differential housing member and the cam member.

18. The vehicle drivetrain of claim 17, wherein a plurality of teeth are formed in each of the cam member and the differential case member, the plurality of teeth formed in the cam member being meshingly engaged with the plurality of teeth formed in the differential case member to transmit torque therebetween when the cam member is positioned in the engaged position.

19. A differential assembly comprising:

a first housing member having an abutting face and configured to rotate about a differential axis;

a second housing member configured to rotate about the differential axis, the first and second housing members defining a cavity and being configured to receive a torsional input;

a cam member disposed within the cavity and configured to rotate about the differential axis, the cam member having a cam portion and a toothed portion, the cam portion engaging the abutting face of the first housing member;

a differential case member rotatably supported about the differential axis within the cavity between the cam member and the second housing member, the differential case member having a toothed portion extending towards the cam member; and a biasing mechanism disposed within the cavity between the cam member and the differential case member, for the biasing mechanism urging the cam member and the differential case member away from one another;

wherein interaction between the cam portion and the abutting face causes the cam member to translate along the differential axis when the torsional input exceeds a predetermined threshold such that the toothed portion of the cam member engages the toothed portion of the differential case member to transfer at least a portion of the torsional input from the first and second housing members to the differential case member.

20. The differential assembly of claim 19, wherein a differential gear set is coupled to and rotatably supported within the differential case member.

21. The differential assembly of claim 19, wherein the biasing mechanism is a spring.

22. The differential assembly of claim 19, wherein a thrust washer is disposed between the differential case member and the second housing member.

23. The differential assembly of claim 19, wherein the abutting face includes a plurality of alternating first peaks and first valleys and the cam portion includes a plurality of alternating second peaks and second valleys that are similar to the first peaks and first valleys, respectively.

24. The differential assembly of claim 23, wherein relative rotation between the abutting face and the cam portion is induced when the torsional input exceeds the predetermined threshold such that the cam member translates along the differential axis to engage the toothed portion of the differential case member.

* * * * *